United States Patent [19]

Fischer et al.

[11] Patent Number: 5,507,423
[45] Date of Patent: Apr. 16, 1996

[54] PUSH-PUSH VEHICLE CLOTHES HOOK ASSEMBLY

[75] Inventors: Douglas A. Fischer, Grand Rapids; Todd C. Adams, Hudsonville, both of Mich.

[73] Assignee: Prince Corporation, Holland, Mich.

[21] Appl. No.: 396,127

[22] Filed: Feb. 28, 1995

[51] Int. Cl.⁶ .................... B60R 7/00; B60R 7/10
[52] U.S. Cl. .............. 224/313; 224/281; 224/545; 224/548; 224/310; 224/311; 224/927; 296/37.7; 296/37.8
[58] Field of Search .................... 248/308, 306, 248/339, 322; 224/281, 310, 313, 42.45 A, 42.46, 311, 545, 548, 927; 296/214, 37.7, 37.8

[56] References Cited

U.S. PATENT DOCUMENTS

| | | | |
|---|---|---|---|
| 2,077,629 | 4/1937 | Lahr | 248/294 |
| 3,385,547 | 5/1968 | West | 248/205 |
| 3,424,418 | 1/1969 | Freedman et al. | 248/216 |
| 4,221,354 | 9/1980 | Kempkers | 248/293 |
| 4,720,028 | 1/1988 | Takemura et al. | 224/42.45 A |
| 5,020,845 | 6/1991 | Falcoff et al. | 296/37.7 |
| 5,050,922 | 9/1991 | Falcoff | 296/37.8 |
| 5,226,569 | 7/1993 | Watjer et al. | 224/313 |
| 5,259,580 | 11/1993 | Anderson et al. | 248/311.2 |
| 5,289,962 | 3/1994 | Tull et al. | 224/42.45 R |
| 5,381,586 | 1/1995 | Busscher et al. | 16/297 |

*Primary Examiner*—Henry J. Recla
*Assistant Examiner*—Timothy L. Maust
*Attorney, Agent, or Firm*—Price, Heneveld, Cooper, DeWitt & Litton

[57] ABSTRACT

A vehicle coat hook assembly in which the coat hook is recessed into the header and is actuated to hanging and recessed positions by a simple push and release by the operator which linearly moves the coat hook to such positions. The actuation of the coat hook is controlled by a push-push mechanism.

16 Claims, 3 Drawing Sheets

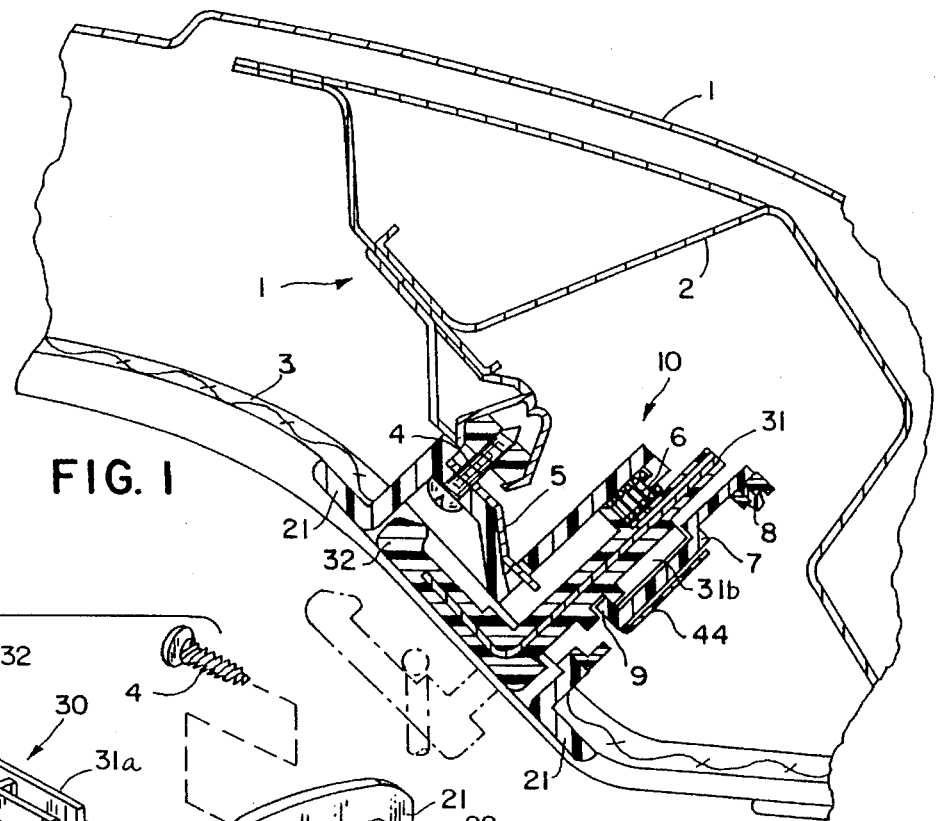
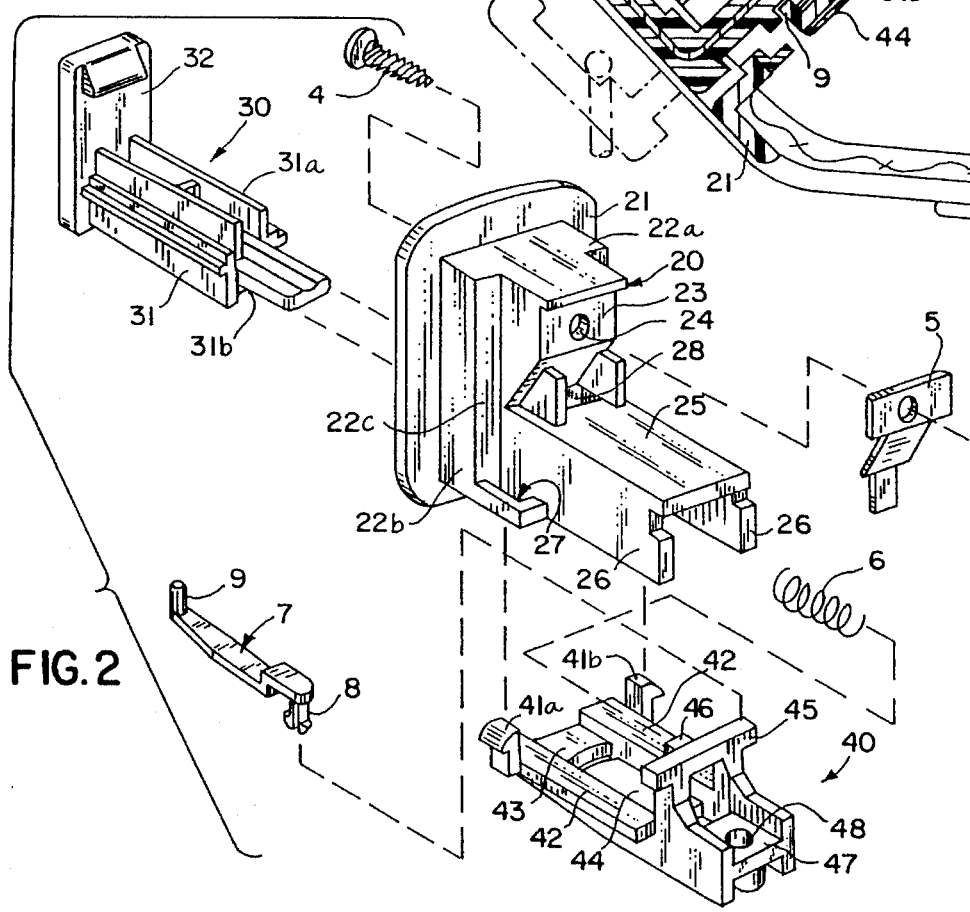

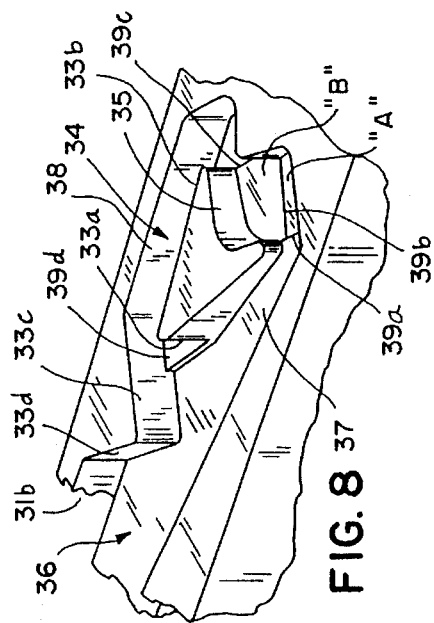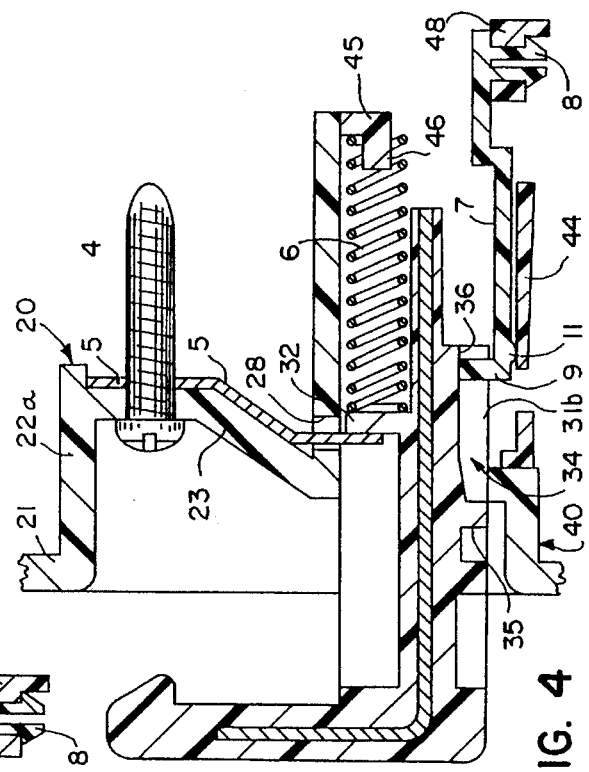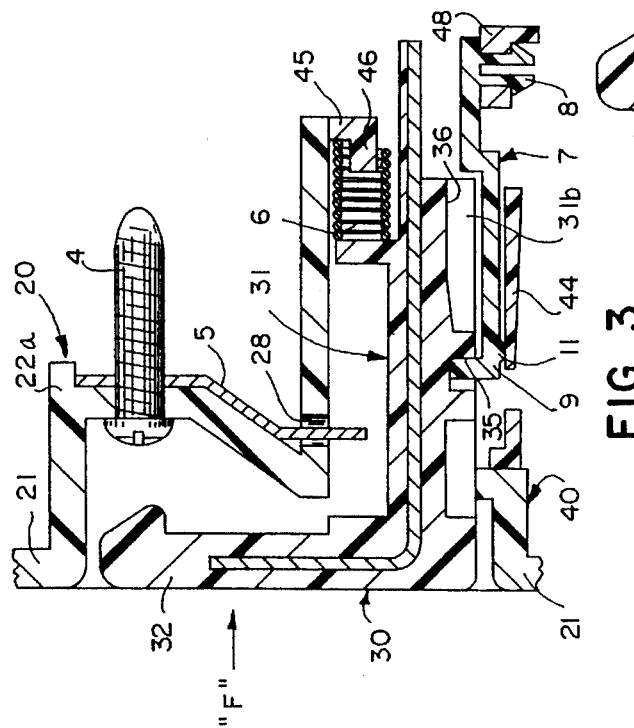

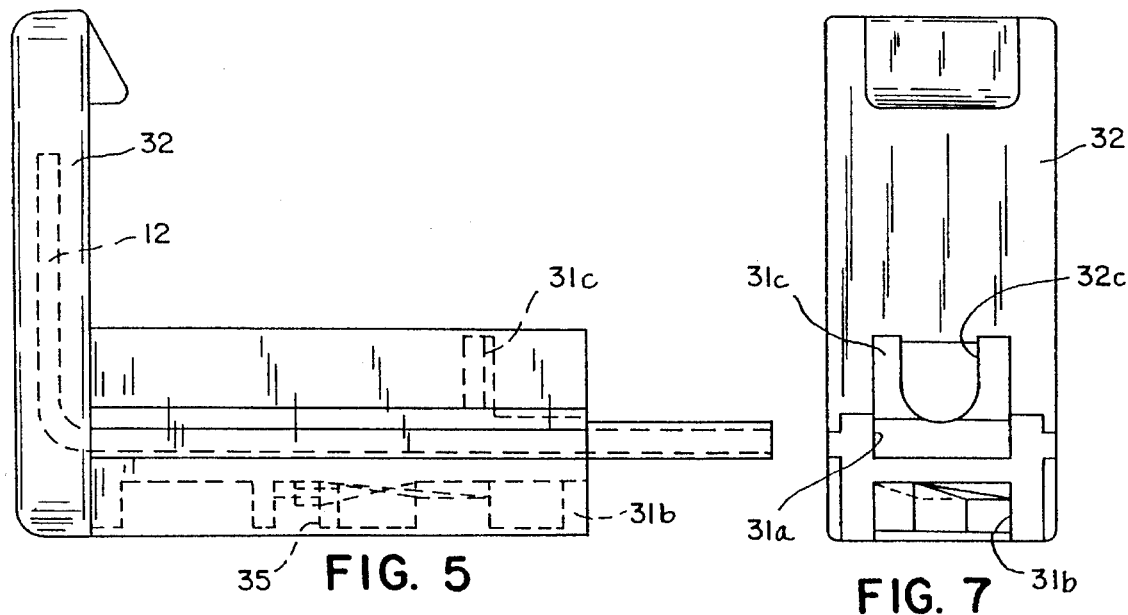
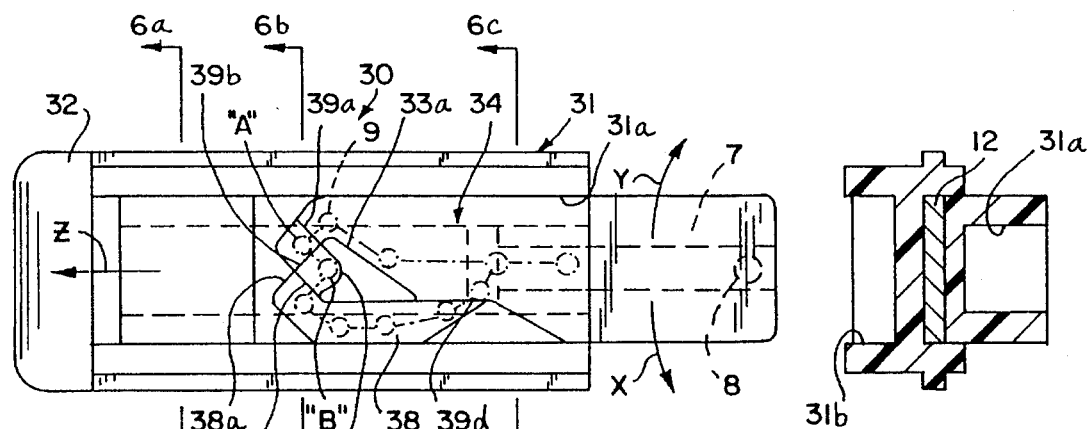
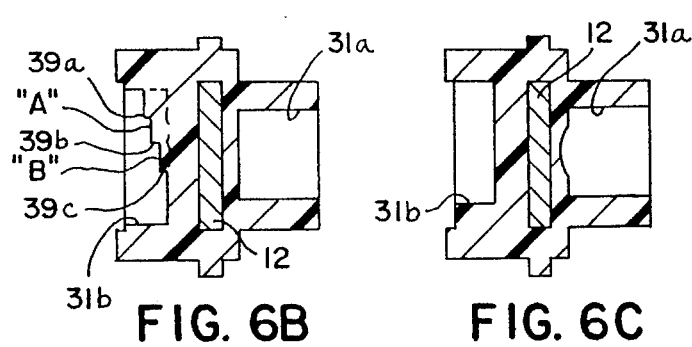

PUSH-PUSH VEHICLE CLOTHES HOOK ASSEMBLY

This invention relates to a clothes hook assembly for an automobile vehicle in which the assembly is mounted on the roof of the vehicle within the header for the vehicle roof. More specifically, it relates to such a coat hook which is recessed in its normal position and can be extended to the hanging position by pushing on the hook and then releasing the same.

BACKGROUND OF THE INVENTION

In present day vehicles, it is customary to include a coat hook mounted along the edge of the header of an automotive vehicle on which clothes hangers can be hung immediately adjacent the side of the vehicle. One drawback of such coat hangers is that they extend into the inside of the vehicle presenting a danger of a passenger hitting his or her head on the hook and, therefore, it has become necessary to restrict the distance the coat hook extends from the header.

Further, many of the coat hooks for vehicles affect the aesthetics of the header and, as a result, it has been desirable to recess the coat hook within the header. Attempts have been made to recess such coat hooks but this has created the problem of providing a means for extending the coat hook when it is to be extended for hanging purposes.

SUMMARY OF THE INVENTION

Our invention solves the above problems by providing a coat hook for a vehicle which, when not used, is recessed within the header, thereby providing more head room and preventing accidental striking of the passenger's head on the hook. The coat hook is recessed so as to provide a smooth surface on the header eliminating the undesirable appearance of a coat hook extending away from the header and adversely affecting the aesthetics of the header. The present invention solves the problem of actuating a recessed clothes hook by providing a linearly reciprocal coat hook that is operatively connected to a push-push mechanism which holds the coat hook in the recessed position and extends the coat hook to the hanging position in response to applying a push force on the coat hook toward the roof of the vehicle and then releasing the same. The coat hook is returned to the recessed, retracted position by applying a force in the same direction which pushes the coat hook so as to be latched in the recessed position.

In our preferred embodiment, the coat hook includes a base slideably mounted in a housing and having an upright hook member for preventing hangers from sliding off the base. The coat hook is of a size and shape to fit within the frame of a bezel so as to substantially cover the opening of the bezel. A support structure is secured to the bezel and constitutes a housing for containing the base and the push-push mechanism. The push-push mechanism is located on the bottom surface of the base. The bottom surface has a first track and a second track, both leading to a retainer recess. A pivot link is pivotally mounted in the housing below the base. It has a latching pin extending upwardly into one or the other of the tracks or the retainer recess. When the pin extends into the retainer recess, the coat hook is in the recessed position and is held in that position. When a push force is applied to the hook member, the pin is forced from the retainer recess into one of the tracks where it is guided as a biasing spring forces the coat hook outwardly to a hanging position. When the coat hook is to be retracted into the bezel so that the hook member is flush with the bezel and the header, a push force is applied to the hook member causing the pin to enter into the second track and be guided thereby to the retainer recess in which position the pin is latched within the retainer recess for holding the coat hook in the recessed position.

Having briefly described our invention, the details and operation thereof will become more evident from the following description made in conjunction with the drawings.

BRIEF DESCRIPTION OF THE DRAWINGS

Referring to the drawings:

FIG. 1 is a cross-sectional, elevational view of a portion of the roof and header of a vehicle with the clothes hook assembly of this invention in the recessed position;

FIG. 2 is an exploded, perspective view of the various components of the assembly of FIG. 1;

FIG. 3 is a partial, cross-sectional, side-elevational view of the clothes hook assembly of this invention in the recessed position;

FIG. 4 is a partial, cross-sectional, side-elevational view of the clothes hook assembly with the coat hook in the extended or hanging position;

FIG. 5 is a side-elevational view of a coat hook which is one component of the assembly of this invention;

FIG. 6 is a bottom view of the coat hook of FIG. 5;

FIGS. 6A, 6B, and 6C are cross-sectional views taken along the planes 6A, 6B, and 6C, respectively, of FIG. 6;

FIG. 7 is an end view of the coat hook of FIG. 5; and

FIG. 8 is an isometric view of the bottom surface of the coat hook.

DESCRIPTION OF THE PREFERRED EMBODIMENT

Referring to the drawings, FIG. 1 discloses the roof 1 of the vehicle constructed of steel or other suitable materials such as fiberglass. Mounted under the roof 1 is the side rail assembly 2 located along the top side edge of the vehicle roof. The roof 1 and side rail assembly 2 support the header 3 and also the coat hook assembly 10 of this invention.

FIG. 2 best discloses the various components of the coat hook assembly of this invention. These components include the bezel 20, the coat hook 30, and the lower housing 40. The bezel 20 and lower housing 40 provide a housing for slideably receiving the coat hook 30 and the push-push mechanism as will be described hereinafter. These components are all interconnected to provide for holding the coat hook 30 in a recessed position as disclosed in FIGS. 1 and 3 and also releasing the coat hook 30 for extension to a hanging position as disclosed in phantom in FIG. 1 and also as disclosed in FIG. 4.

Referring to FIGS. 1–4, bezel 20 includes the frame 21 from which extends top wall 22a, side walls 22b, and back wall 22c providing a recess for receiving the hook portion 32 of the coat hook 30. Wall 23 extends essentially downwardly from the top wall 22a and includes an opening 24 for receiving a mounting screw 4 which attaches the bezel 20 to the side rail as disclosed in FIG. 1. Mounting screw 4 also attaches the stop bracket 5 to the bezel as disclosed in FIGS. 1, 3, and 4. Opening 28 is provided to receive stop bracket 5 extending downwardly therethrough. A housing pan 25 extends rearwardly of the back wall 22c. This housing part 25 includes the walls 26 which guide base 31 of the coat hook 30 as will be explained hereinafter.

The lower housing part 40 is secured to the bottom edges of the walls 26 of bezel 20 by means of hooks 41a and 41b extending into openings 27 on the sides of the walls 26. When assembled, the housing part 25 of bezel 20 and the lower housing part 40 form a housing for slideably receiving base 31 of coat hook 30 as will be described hereinafter.

The lower housing part includes the side walls 42, the bottom wall portion 43, and a leaf spring 44. A tower-like flange 45 extends upwardly from the side walls 42 and includes a protrusion 46 for receiving one end of coil spring 6. A bottom wall portion 47 includes an opening 48 for receiving a pivot axle 8 of a pivot link 7 which includes a pin 9 located at the opposite end of pivot link 7 from the pivot axle 8.

The coat hook 30 is best shown in FIGS. 2 and 5–8. It is "L" shaped and includes the base 31 and an upright hook member 32 of which the outer peripheral shape conforms to the opening in the frame 21 of bezel 20. A metal reinforcement insert 12 is provided in the "L" shaped hook. The base 31 is "H" shaped (FIGS. 6A, 6B, and 6C) thereby providing the upper channel 31a and a lower channel 31b. The upper channel 31a includes a flange 31c extending upwardly and having a recess 31d for capturing one end of the spring 6 as will be described hereinafter.

The bottom channel 31b includes a track arrangement 34 leading to and exiting from a retainer recess 35 (FIGS. 6 and 8). This track and retainer arrangement best described in relation to FIG. 8 cooperates with the pivot link 7 and spring 6 to provide the push-push mechanism as will be described hereinafter. The track arrangement 34 includes an entrance 36 leading to an entrance track 37 and an exit track 38. In the following description of the bottom of base 31 with reference to FIG. 8, it should be understood the bottom is facing upwardly rather than downwardly and therefore use of the terms "down" and "up" are opposite to that which actually occurs. For example, the entrance track 37 is ramped upwardly as viewed in FIG. 8, but in reality it is ramped downwardly as viewed in FIGS. 5 and 7 until it reaches step 39a which steps down (but in reality up) to the surface "A."

Flat surface "A" is adjacent to the flat surface "B" which is stepped down from level "A" by the step 39b. Surface "B" is located at the retainer recess 35. Thus, repeating the path of pin 9 as the coat hook 30 is slid inwardly to the recessed position of FIGS. 1 and 3, pin 9 slides in entrance track 37 which provides an entrance to retainer recess 35 by being ramped upwardly to the step 39a from which it drops to the surface "A" and then drops off the step 39b to the surface "B" into the retainer recess 35.

A step 39c is provided between the surface "B" and the exit track 38, the exit track 38 leading to the entrance 36 as it is ramped downwardly to the step 39d. As will be explained hereinafter, the guide surfaces 33a, 33b, 33c, and 33d are provided for guiding the pin 39 through the tracks 37 and 38 as the pin enters and exits from the retainer recess. Also, as will be explained, steps 39a, 39b, 39c, and 39d assist in directing the pin through the tracks 37 and 38 into latched and unlatched positions within the retainer recess 35.

ASSEMBLY

Having described the various components of the present invention, the assembly of the component should be evident. As disclosed in FIGS. 1, 3, and 4, the lower housing part 40 is mounted on the lower edges of the walls 26 of the bezel 20 to form a housing in which the base 31 of the coat hook 30 slides from the recessed position of FIG. 3 to the hanging position of FIG. 4. As will be noted, the stop bracket 5 secured to the wall 23 of the bezel 20 extends downwardly through the opening 28 of the bezel and provides a stop against which the flange 32 abuts to limit the outward extension of the coat hook. Pivot link 7 is pivotally mounted by the pivot axle 8 located within the opening 48. In this position, the pin 9 extends upwardly as viewed in FIGS. 3 and 4 into the bottom channel 31a of base 31. In the retracted or recessed position of FIG. 3, pin 9 is located in the retainer recess 35 whereas in the extended hanging position, pin 9 is located in the entrance 36 of the track arrangement 34. The distal end of pivot link 7 includes a rounded protrusion 11 which in both of the positions of FIGS. 3 and 4 engages the leaf spring 44 so as to exert an upward biasing force on the distal end so as to always maintain the pin within the track arrangement 14.

Spring 6 at one end is located over the protrusion 46 of the tower-like flange 45 and is captured or sandwiched between the flange 45 and the flange 31c of the coat hook so as to constantly exert a biasing force against the coat hook in a direction outwardly of the bezel 20. The entire assembly 10 is mounted by screw 4 on the side rail 2 beneath the roof and within an opening of the header 3.

OPERATION

Having described the various components of this invention and the assembly thereof, the operation of this invention should be evident. Starting with the coat hook 30 in the recessed or retracted position, pin 9 is located in the retainer recess 35 and is held in that position by the spring 6 exerting a biasing force on the upright hook member forcing it against the pin 9. In order to extend coat hook 30 to the extended or hanging position of FIG. 4, a push force is exerted on the face of the upright hook member. This forces the base 31 in the "Y" direction as viewed in FIG. 6 which causes the pivot link 7 to engage wall 38a and pivot in a direction as designated by the arrow "X." Thus, pin 9 moves out of retainer recess 35 and when the push force is released by the operator, spring 6 biases the coat hook in the "Z" direction, causing pin 9 to drop over step 39c and ride along the exit track 38 until it drops over the step 39d and eventually is stopped in the entrance 36 as flange 32 engages the stop bracket 5. In the hanging position of FIG. 4, coat hangers or clothes can be hung on coat hook 30 as disclosed in the phantom lines of FIG. 1.

When use is no longer desired, the operator pushes on the face of the upright hook member 32 in the direction of the arrow "Y" causing the base 31 to slide inwardly on the surface 43 and between the walls 26 of the housing formed by the bezel 20 and lower housing part 40. As the base is slid inwardly to the recess position, pin 9 slides in entrance track 37 toward the direction of the arrow "Z" (FIG. 6) and engages the guiding surface 33a which guides the pin to the step 39a from which the pin drops to the surface "A." The pin then drops over the step 39b onto the surface "B" where the spring 6, after the operator releases the push force, forces the coat hook in the direction of the arrow "Z" so that the pin is latched into the retainer recess 35.

It should be evident from the above description and the drawings that this invention provides a coat hook that is recessed within the header and can easily be actuated to the extended hanging position by a simple push and release on the coat hanger and can be returned to the recess retracted position by a push on the coat hook in the same direction and then releasing the same.

Having described our invention in detail, it should be understood that although we have disclosed the preferred embodiments, many variations can be made without departing from the spirit and scope of this invention, all as defined in the appended claims.

The embodiments of the invention in which an exclusive property or privilege is claimed are defined as follows:

1. A recessed clothes hook assembly for hanging clothes hangers in a vehicle said hangers having a J-shaped hook comprising:

a support structure adapted to be mounted in the roof structure of a vehicle;

an "L" shaped hanger support member is adapted to receive said J-shaped hook in straddling relationship thereto and is reciprocally mounted in said support structure for linear movement from an inward recessed position to an outwardly extended position and vice versa;

a biasing spring exerting a bias on said hanger support member outwardly toward said extended position from said recessed position;

a push-push mechanism mounted in said support structure and operatively connected to said hanger support member;

said push-push mechanism normally holding said hanger support member in a recessed position;

said mechanism constructed to release said hanger support member when a first push force is exerted inwardly on said hanger support member thereby permitting said biasing spring to force said hanger support member outwardly to said extended position; and said mechanism being constructed to return said hanger support member to a recessed position when a second push force is exerted inwardly on said hanger support to said recessed position and said second push force is then released.

2. The clothes hook assembly of claim 1 in which said support structure includes a housing provided for said hanger support member and said hanger support member includes a base slideably mounted in said housing;

said base having an upper surface and a bottom surface, said bottom surface having a first track leading to a retainer recess and a second track leading from said retainer recess;

a pivot link pivotally mounted in said housing and having a latching pin extending in one position upwardly into one of said tracks and in another position extending upwardly into said retainer recess;

said pin extending into said retainer recess in said recessed position;

said pin being guided in said second track from said retainer recess by application of said first push force;

said pin being guided in said first track when said hanger is moved from extended position to recessed position by application of said second push force; and said first track guiding said pin into said retainer recess upon movement of said hanger support member from extended position to recess position by application and release of said second push force.

3. The hook assembly of claim 1 in which said "L" shaped hanger support member comprises an elongated base having an upper surface over which hangers are hung and an upright hook member extending generally upwardly from said surface to prevent hangers from slipping off said base and said push-push mechanism is located in said housing under said upper surface of said base.

4. The hook assembly of claim 2 in which said housing is formed by a first part comprising said support structure and a second part comprising a lower housing part.

5. The hook assembly of claim 3 in which said housing is formed by a first part comprising said support structure and a second part comprising a lower housing part.

6. The hook assembly of claim 5 in which said biasing spring is located above said base, said biasing spring being captured between a flange extending upwardly from the upper surface of said base and said housing.

7. The hook assembly of claim 6 in which a downwardly extending stop is provided in said housing for engagement by said flange to limit the outward extension of said hanger support member.

8. The hook assembly of claim 4 in which said pivot link is pivotally mounted on said lower housing part.

9. The hook assembly of claim 8 in which said biasing spring is located above said base, said biasing spring being captured between a flange extending upwardly from the upper surface of said base and said housing.

10. A recessed clothes hook assembly for hanging clothes hangers in a vehicle, said hangers including a J-shaped hook and said assembly having means for supporting said clothes hook assembly in the roof of a vehicle comprising:

a coat hook adapted to receive said J-shaped hook in straddling relationship thereto;

a support structure for reciprocally and slideably supporting said coat hook for linear movement from a retracted, recessed position to a hanging position; and a push-push mechanism for moving said coat hook from a retracted position to a hanging position in response to applying a first push force on said coat hook in a direction toward the roof and for moving said coat hook from a hanging position to a retracted position in response to applying a second push force on said coat hook in a direction toward said roof.

11. The clothes hook assembly of claim 10 in which said coat hook is "L" shaped and comprises an elongated base having an upper surface over which hangers are hung and an upright hook member extending generally upwardly from said surface to prevent hangers from slipping off said base and said first and second push forces are applied to said hook member toward said roof and said push-push mechanism is located under said upper surface of said base.

12. The clothes hook assembly of claim 11 in which a bezel having a frame with an opening is provided and said hook member is shaped to fit into and substantially cover said opening.

13. The clothes hook assembly of claim 12 in which said support structure is secured to said bezel and constitutes a housing for containing said base and said push-push mechanism.

14. The clothes hook assembly of claim 10 in which said coat hook includes a base slideably mounted in said support structure;

said base having an upper surface and a bottom surface, said bottom surface having a first track and a second track, both leading to a retainer recess;

a pivot link pivotally mounted in said support structure and having a latching pin in one position extending upwardly into one of said tracks and in another position extending upwardly into said retainer recess;

said pin extending into said retainer recess in said recessed position;

said pin being guided in said second track from said retainer recess by application of said first push force; and said pin being guided in said first track when said hanger is moved from extended position to recessed position by application of said second push force; said first track guiding said pin into said retainer recess upon movement of said hanger support member from extended position to recess position by application and release of said second push force.

15. The hook assembly of claim 14 in which said biasing spring is located above said base and is captured between a flange extending upwardly from the upper surface of said base and said housing.

16. The hook assembly of claim 15 in which a downwardly extending stop is provided in said housing for engagement by said flange to limit the outward extension of said hanger support member.

* * * * *